(12) United States Patent
Sitton

(10) Patent No.: US 8,917,746 B2
(45) Date of Patent: *Dec. 23, 2014

(54) PASSIVE OPTICAL NETWORK PROCESSOR WITH A PROGRAMMABLE DATA PATH

(71) Applicant: Broadcom Corporation, Irvine, CA (US)

(72) Inventor: Gal Sitton, Netanya (IL)

(73) Assignee: Broadcom Corporation, Irvine, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/847,935

(22) Filed: Mar. 20, 2013

(65) Prior Publication Data

US 2013/0209104 A1 Aug. 15, 2013

Related U.S. Application Data

(63) Continuation of application No. 12/821,931, filed on Jun. 23, 2010, now Pat. No. 8,451,864.

(51) Int. Cl.

| H04L 12/00 | (2006.01) |
|---|---|
| H04L 12/54 | (2013.01) |
| H04Q 11/00 | (2006.01) |
| H04B 10/27 | (2013.01) |
| H04J 14/02 | (2006.01) |

(52) U.S. Cl.
CPC ........... *H04B 10/27* (2013.01); *H04Q 11/0067* (2013.01); *H04J 14/0269* (2013.01); *H04J 14/0282* (2013.01); *H04J 14/0254* (2013.01); *H04J 14/0247* (2013.01); *H04Q 2011/0084* (2013.01); *H04J 14/0252* (2013.01)
USPC ........................... 370/469; 370/419; 370/412

(58) Field of Classification Search
USPC ................ 370/390, 465, 469, 907, 419, 412; 398/45, 58
See application file for complete search history.

(56) References Cited

U.S. PATENT DOCUMENTS

| 6,519,255 | B1 | 2/2003 | Graves | |
|---|---|---|---|---|
| 7,370,127 | B2 | 5/2008 | Avishai et al. | |
| 7,643,753 | B2 | 1/2010 | Weitz et al. | |
| 7,801,161 | B2 | 9/2010 | Levy et al. | |
| 7,876,762 | B2 * | 1/2011 | Yang | 370/395.3 |
| 8,451,864 | B2 * | 5/2013 | Sitton et al. | 370/469 |
| 8,634,431 | B1 * | 1/2014 | Chiang et al. | 370/412 |
| 8,792,353 | B1 * | 7/2014 | Janarthanan et al. | 370/236 |
| 2003/0061332 | A1 * | 3/2003 | Narad et al. | 709/223 |
| 2004/0136534 | A1 | 7/2004 | Stiscia et al. | |
| 2004/0136712 | A1 | 7/2004 | Stiscia et al. | |
| 2007/0070997 | A1 | 3/2007 | Weitz et al. | |
| 2007/0074218 | A1 | 3/2007 | Levy et al. | |
| 2007/0116466 | A1 | 5/2007 | Gewirtzman et al. | |

(Continued)

*Primary Examiner* — Ahmed Elallam
(74) *Attorney, Agent, or Firm* — Sterne Kessler Goldstein & Fox P.L.L.C.

(57) ABSTRACT

A method and apparatus embodying some aspects of a packet processing communication system. The packet processing communication apparatus comprises a packet processor and a microprocessor. The packet processor is configured to process packets belonging to a certain flow through a plurality of processing stages of a programmable data-path. The microprocessor is in communication with the packet processor and is configured to process a user-defined function in the programmable data-path on designated packets belonging to the certain flow. The packets of respective flows to be processed by the microprocessor are designated in a mapping. The designated packets processed by the microprocessor are returned to one of the processing stages of the packet processor for further processing.

21 Claims, 5 Drawing Sheets

(56) References Cited

U.S. PATENT DOCUMENTS

| | | |
|---|---|---|
| 2009/0092136 A1 | 4/2009 | Nazareth et al. |
| 2009/0208204 A1 | 8/2009 | Zhang et al. |
| 2009/0208211 A1 | 8/2009 | Tamai |
| 2009/0263133 A1 | 10/2009 | Nakagawa et al. |
| 2009/0279548 A1* | 11/2009 | Davis et al. .................... 370/394 |
| 2009/0304386 A1 | 12/2009 | Effenberger |
| 2010/0254386 A1 | 10/2010 | Salinger et al. |
| 2011/0064084 A1* | 3/2011 | Tatar et al. .................... 370/392 |
| 2011/0235635 A1 | 9/2011 | Yadav |
| 2011/0318002 A1 | 12/2011 | Sitton |
| 2014/0068622 A1* | 3/2014 | Gmuender et al. ........... 718/102 |

\* cited by examiner

PASSIVE OPTICAL NETWORK PROCESSOR WITH A PROGRAMMABLE DATA PATH

CROSS-REFERENCE TO RELATED APPLICATIONS

This application is a continuation of U.S. patent application Ser. No. 12/821,931, filed Jun. 23, 2010, which issued as U.S. Pat. No. 8,451,864 on May 28, 2013.

TECHNICAL FIELD

The present disclosure generally relates to processing of network traffic, and more particularly to implementing a PON processor.

BACKGROUND OF THE INVENTION

Passive optical networks (PON) have been developed to provide high bandwidth traffic for subscribers over an optical cable. An exemplary diagram of a typical PON 100 is schematically shown in FIG. 1. The PON 100 includes M optical network units (ONUs) 120-1, 120-2, through 120-M (collectively ONU 120), coupled to an optical line terminal (OLT) 130 via a passive optical splitter 140. Traffic data transmission may be achieved by transmitting data over two optical wavelengths, one for the downstream direction and another for the upstream direction. Downstream transmission from the OLT 130 is broadcasted to all ONUs 120. Each ONU 120 filters its respective data according to, for example, pre-assigned tag values. ONUs 120 transmit respective data to OLT 130 during different time slots allocated by OLT 130 for each ONU 120. Splitter 140 splits a single line into multiple lines, for example, 1 to 32, or, in case of a longer distance from OLT 130 to ONUs 120, 1 to 16.

An ONU includes a PON processor utilized for processing downstream traffic received from the OLT and providing the contents of the downstream traffic to one or more subscriber devices. Similarly, the PON processor of the ONU is designed to receive and transmit upstream data from one or more subscriber devices to the OLT via the passive optical network.

FIG. 2 shows an exemplary diagram of a PON processor 200. The PON processor 200 typically includes a microprocessor 210, a packet processor 220, an Ethernet media access control (MAC) adapter 230, a PON MAC adapter 240, and a memory controller 250 that interacts with an external memory. The various components of the PON processor 200 communicate through an internal bus 260. An example for a PON processor is shown in U.S. Pat. No. 7,643,753 assigned in common to the same assignee as the present application, and is hereby incorporated for all that it contains.

In the architecture of the PON processor 200, there are two logic paths: data and control. In the data path, traffic from/to the PON is processed by the packet processor 220. The processing tasks in the data path include, for exempla, bridge learning, queuing, shaping, and reassembling of packets. Data processed by the packet processor 220 may be either an upstream flow, i.e., data sent from a subscriber device to the OLT or a downstream flow, i.e., data sent from the OLT to a subscriber device. The packet processor 220 is a dedicated piece of hardware designed to accelerate the processing of packets belonging to a certain flow.

In the control path, the microprocessor 210 executes tasks that are typically related to management of connections handled by the PON processor 200. For example, such tasks include, but are not limited to, open/close connections, control the state of a connection, identifying traffic received on a new connection, and so on. Such operations generally do not require processing of individual packets belonging to a certain flow. For example, if the microprocessor 210 identifies a packet received on a new connection, then the processing of the first packet will be performed by the microprocessor 210 and subsequence packets are handled only by the packet processor 220.

In addition to different processing tasks performed by the packet processor 220 and microprocessor 210, each processor is programmable differently. Specifically, in order to allow fast processing of traffic, the packet processor 220 is programmable using firmware, which comprises low-level execution code (e.g., assembly or any proprietary programming language). The firmware includes instructions purposely designed to accelerate the processing tasks of the packet processor 220. The firmware is developed by the vendor of the PON processor 200 and is integrated therein prior to the installation of the PON processor 200 in an ONU. Thus, any modifications in the firmware can be made by the vendor of the PON processor 200.

The microprocessor 210 is typically a general-purpose central processing unit (CPU) that is programmable to execute software that includes high-level programming language (e.g., C) over an operation system. Any modifications to the software of the microprocessor 210 can be performed on-site, for example, by a novice technician of the ONU, by re-programming the software of the microprocessor 210.

On one hand, even a high-performance microprocessor cannot execute processing tasks as fast as dedicated processors, i.e., the packet processor 220. On the other hand, dedicated processors are not as flexible as general-purpose CPUs. For example, if a new processing task should be performed in the data path, the firmware should be re-programmed and re-installed on the PON processor 200. The lack of flexibility in such architectures is a major drawback for the network providers, as once the PON processors 200 are installed in the ONUs 120, modifications to the processing tasks cannot easily be performed on-site.

Thus, it would be highly advantageous to provide programmable network processors that can easily be modified and on-site.

SUMMARY OF THE INVENTION

Certain embodiments of the invention include a network processor. The network processor comprises a packet processor for processing packets belonging to a certain flow through a plurality of processing stages of a programmable data-path; a microprocessor-data for performing one or more user-defined functions in the programmable data-path on designated packets belonging to the certain flow, wherein packets of respective flows to be processed by the microprocessor-data are designated in a flow table; a microprocessor-control for managing connections handled by the PON processor; a data-path bus for connecting the packet processor and the microprocessor-data, wherein the designated packets are transferred between the packet processor and the microprocessor-data on the data-path bus; and a control-path bus for connecting the packet processor and the microprocessor-control.

Certain embodiments of the invention also include a method for processing packets in a programmable data path of a network processor. The method comprises processing, by a packet processor, packets belonging to a certain flow through a plurality of processing stages of the programmable data path; upon completion of an $N^{th}$ processing stage in the data path, dispatching the packets designated in a flow table to a microprocessor-data, wherein the $N^{th}$ processing stage is designated in the flow table as the processing stage that at which the packets should be dispatched; performing, by the Microprocessor-data, user-defined functions on designated packets; and returning the designated packets to the packet processor to complete the processing of such packets through remaining processing stages of the programmable data path.

BRIEF DESCRIPTION OF THE DRAWINGS/FIGURES

The subject matter that is regarded as the invention is particularly pointed out and distinctly claimed in the claims at the conclusion of the specification. The foregoing and other objects, features, and advantages of the invention will be apparent from the following detailed description taken in conjunction with the accompanying drawings.

DETAILED DESCRIPTION OF THE INVENTION

Figure 1:
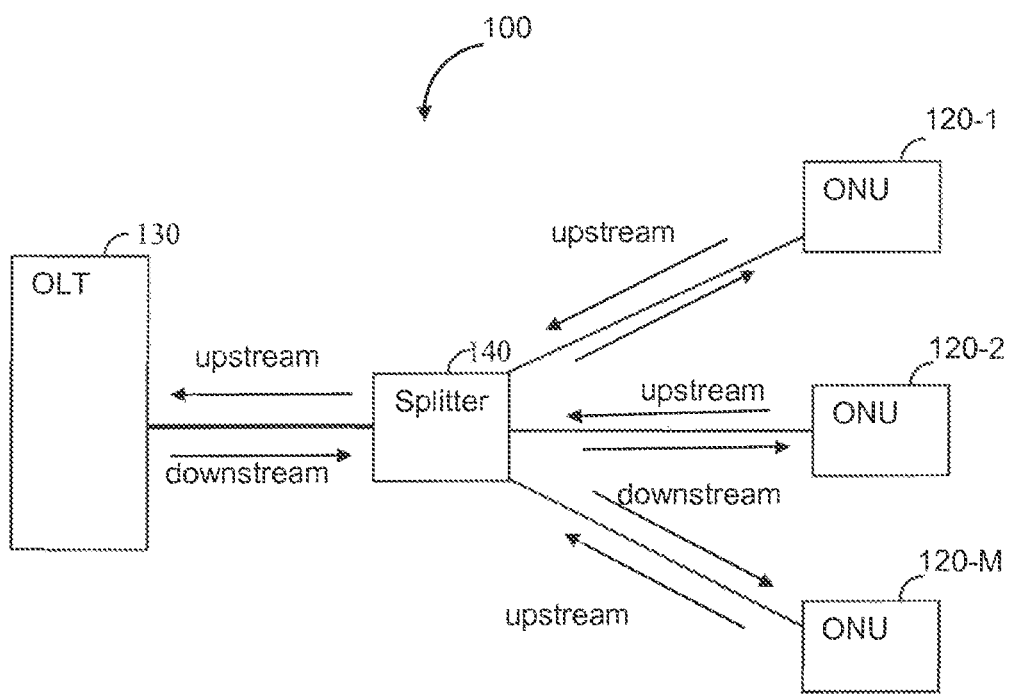
FIG. 1 is a diagram of a PON.
Figure 2:
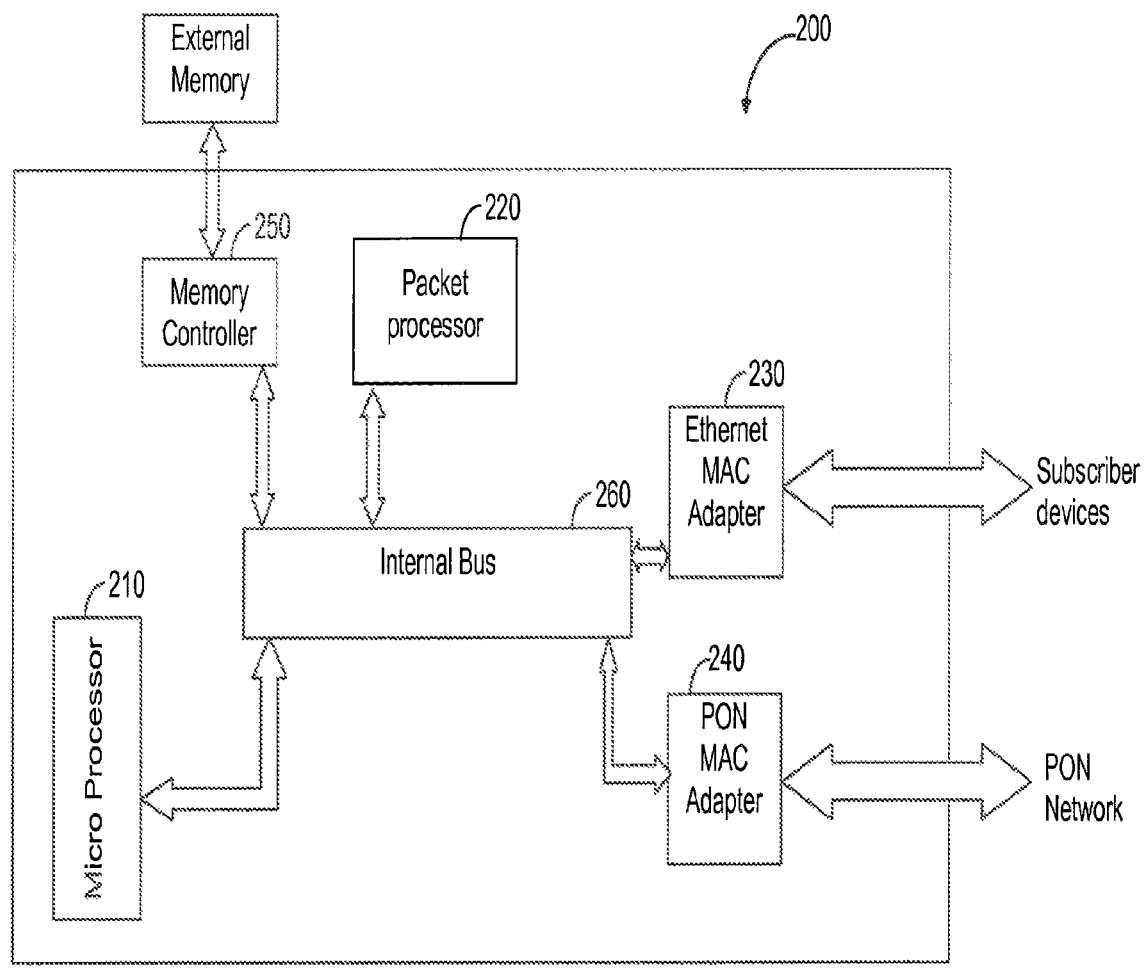
FIG. 2 is a schematic diagram of a PON processor.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 3:
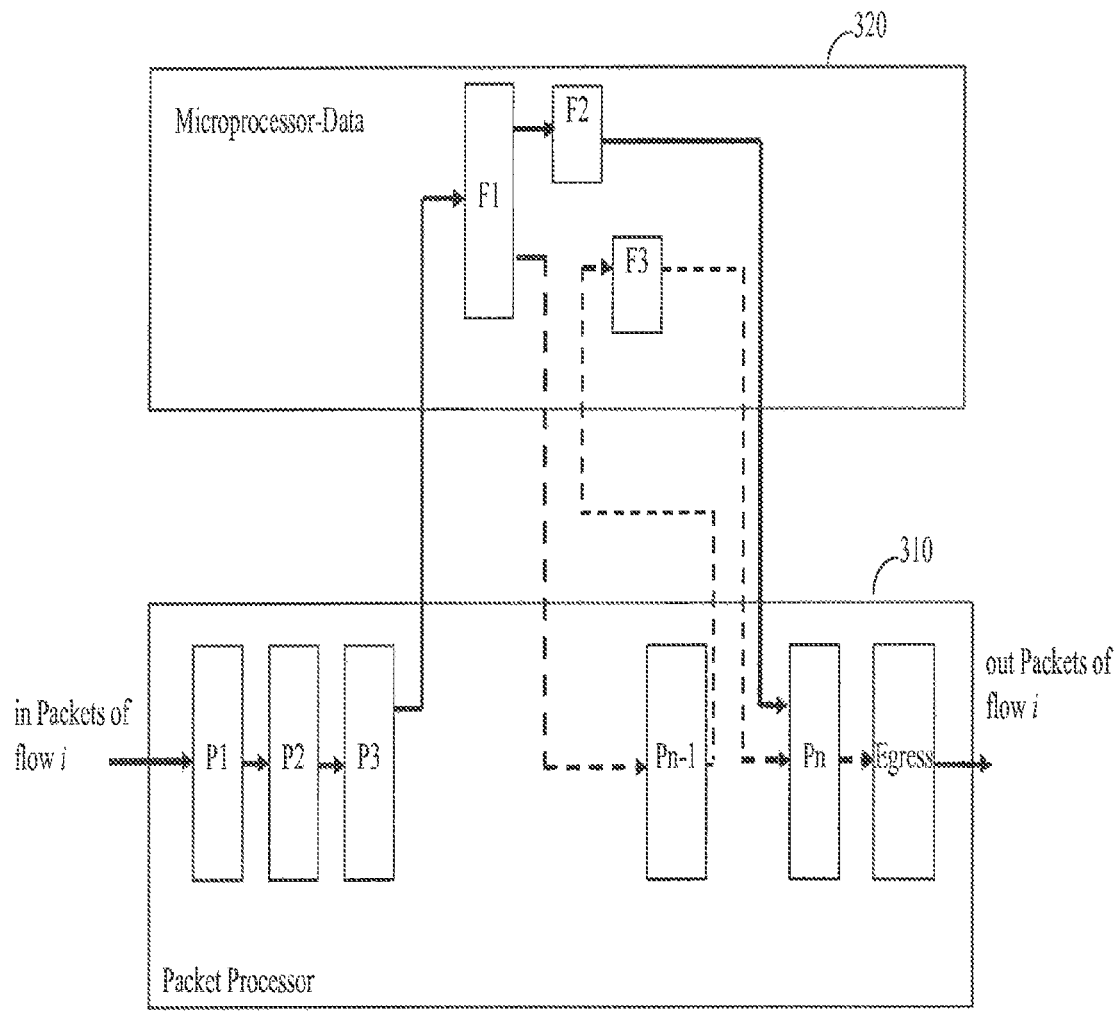
FIG. 3 is a diagram illustrating the principles of an embodiment of the invention.

FIG. 3 shows an exemplary and non-limiting diagram of a data path. In the data path, packets belonging to a certain flow are processed by a packet processor 310 and a first microprocessor (hereinafter microprocessor-data) 320. The firmware of the packet processor 310 is programmable to include multiple processing stages $P_1$ through $P_n$. These stages may include, but are not limited to, parsing, classifying, filtering, encrypting, and routing/bridging of packets.

The microprocessor-data 320 is programmable to process packets belonging to a certain flow. Specifically, the microprocessor-data 320 is designed to perform user-defined tasks (or functions) that are programmed in software (e.g., by technicians on-site) and/or tasks that require high-layer processing (e.g., layer 5 and above of the OSI model). For example, such tasks include, but are not limited to, user custom virtual local area network (VLAN) tag manipulation, packet inspection, advanced access control, quality of service (QoS), and the like.

According to an embodiment of the invention, all packets belonging to a certain flow and should be processed by the microprocessor-data 320 are dispatched by the packet processor 310. Once the processing of such packets is completed by the microprocessor-data 320, they are returned back to the packet processor 310 to one of its processing stages. For example, in the diagram depicted in FIG. 3, the packets are returned either to a processing stage $P_{n-1}$ (which may include encryption of packets) or processing stage $P_n$ (which may include routing of packets through one of egresses). In addition, packets may be returned to a processing stage (illustrated by a dash line) of the packet processor 310 and then back to microprocessor-data 320 for further processing.

When dispatching a packet, the packet processor 310 provides the microprocessor-data 320 with packet information including, for example, a flow-ID, a MAC address, an IP address, and a port number. The microprocessor-data 320 can use this information to retrieve packet from a memory (not shown in FIG. 3). Packets processed by the microprocessor-data 320 are written back to the memory. In another embodiment, packets can be transferred between the packet processor 310 and the microprocessor-data 320 over a data-path bus (not shown in FIG. 3).

The software executed by the microprocessor-data 320 performs fast context switching and parallel processing to reduce latencies when accessing the memory and communicating with the packet processor 310. The software executed by the microprocessor-data 320 is coded using a high-level programming language (e.g., C), thereby the programming can be easily modified by a user.

The flexibility that is provided by implementing a data path as depicted in FIG. 3 will be understood from the following non-limiting example. In a conventional PON processor (e.g., PON processor 200), the firmware of the packet processor is configured with a set of rules designed for performing VLAN tag modification. VLANs are created to provide the segmentation services traditionally provided by routers in LAN configurations. Once installed in the ONU including an addition VLAN tag modification rules requires re-programming the firmware. As mentioned above, this task is performed by the vendor of PON processor. That is, the vendor should program a new version of firmware, test if the new version is operable, and send the new version of firmware to a network provider to install the ONUs with the new firmware. Therefore, even a simple modification to the firmware can take months until implemented.

In the proposed data path, the software of the microprocessor-data 320 can be updated with a new rule for the VLAN tag manipulation and instructions on which flows/packets the new rule should be applied. As the software of the microprocessor-data 320 is written using a high-level programming language and can be updated by the network provider, such a software update can be performed on-site in a matter of hours. It should be appreciated that the VLAN tag manipulation is only one example and other examples will be apparent to one with ordinary skill in the art.

Figure 4:
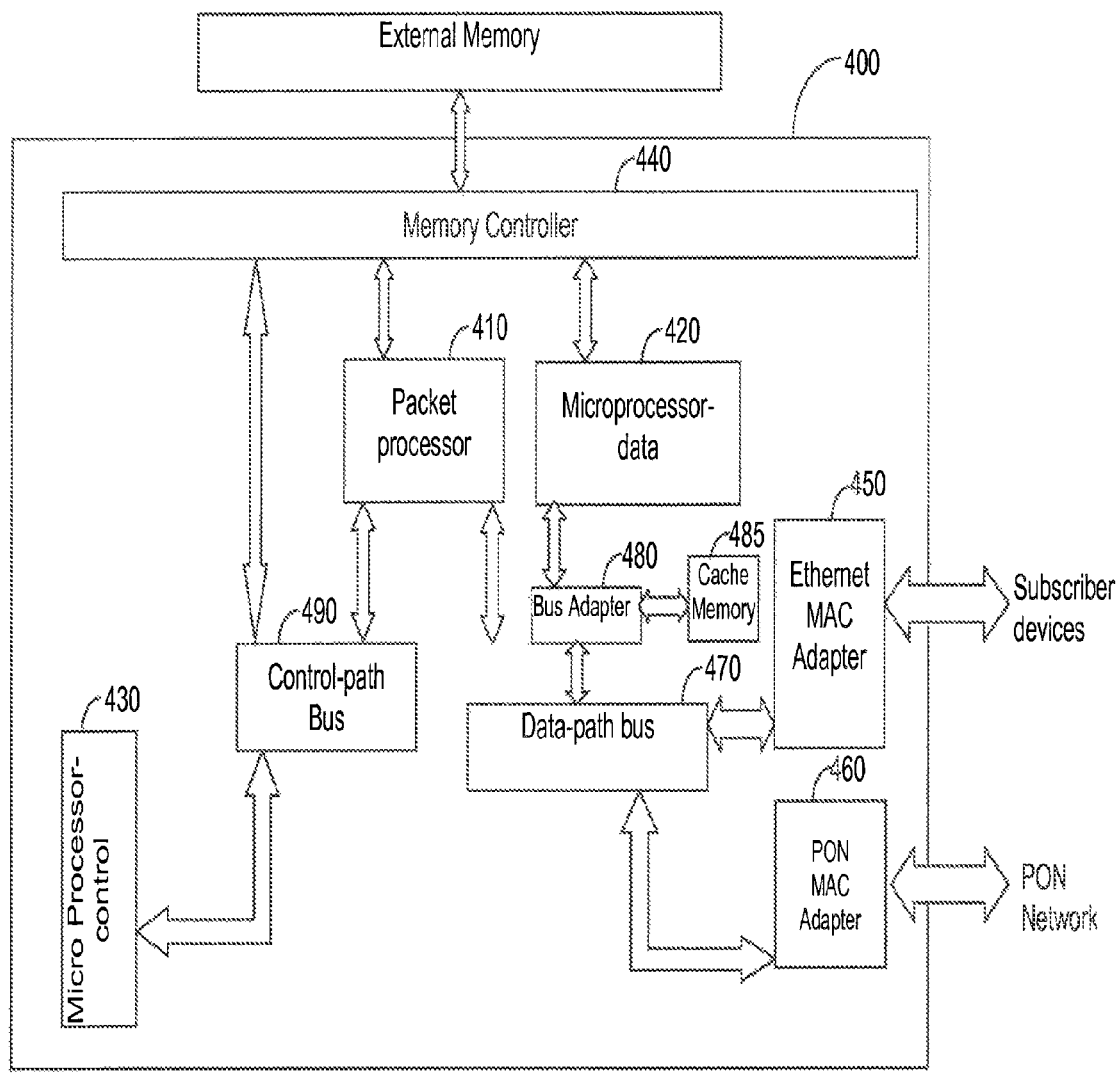
FIG. 4 is a block diagram of a PON processor implemented in accordance with an embodiment of the invention.

FIG. 4 shows an exemplary and non-limiting block diagram of a PON processor 400 implemented in accordance with an embodiment of the invention. The PON processor 400 includes a packet processor 410, a first microprocessor (hereinafter microprocessor-data) 420, a second microprocessor (hereinafter microprocessor-control) 430, a memory controller 440 that interacts with an external memory, an Ethernet MAC adapter 450, and a PON MAC adapter 460. The packet processor 410 communicates with the microprocessor-data 420, Ethernet MAC adapter 450, and PON MAC adapter 460 through a data-path bus 470. The microprocessor-data 420 interfaces with a data path bus using a bus adapter 480 that utilizes a cache memory 485. The packet processor 410, microprocessor-data 420, and memory controller 440 are connected through a control-path bus 490. In certain embodiments of the invention, the PON processor 400 may include an array of packet processors 410.

In accordance with an embodiment, the data-path bus 470 transfers data at high rates and its architecture is based on a push-ahead mechanism, using a binary tree topology. The data-path bus 470 supports parallelism in read and write transactions and allows simultaneous transfer of data from/to various components. A more detailed description of the broad bus 470 can be found in U.S. Pat. No. 7,370,127 assigned in common to the same assignee as the present application, and which is hereby incorporated for all that it contains.

As described in detail above, the microprocessor-data 420 operates together with the packet processor 410 in the data path to process packets belonging to a certain flow. In one embodiment, packets belonging to a designated flow can be transferred on the data-path bus 470. In another embodiment, packets can be read and written to the external memory through the memory controller 440. In order to accelerate the packet processing, the microprocessor-data 420 can use data cached in the memory 485.

The microprocessor-control 430 is operable in the control path and executes tasks that are typically related to management of connections handled by the PON processor 400 and to the control of the PON processor 400. The microprocessor-control 430 does not process individual packets belonging to a certain flow.

Typically, each of the microprocessor-data 420 and microprocessor-control 430 includes internal memory (not shown) that may consist of a program memory to keep the software and the operating system, a data memory to hold data of the various tasks, and a context memory to maintain instances of registers. When updating the software of, for example, the microprocessor-data 420 the new software is uploaded to its internal program memory. In a similar fashion, the packet processor 410 also includes an internal memory (not shown) that consists of a program memory, a context memory, and as data memory. The firmware of the packet processor 410 is saved in the program memory.

In accordance with an exemplary embodiment of the invention, the microprocessor-data 420 and microprocessor-control 430 are high-performance MIPS 74KEC RISC microprocessors. The microprocessor-control 430 is designed to perform time-consuming and complex processing tasks, thus it runs a complete operating system (e.g., Linux). In order to perform fast context switching and parallel processing the microprocessor-data 420 does not run an operating system.

The Ethernet MAC adapter 450 includes a plurality of Ethernet interfaces for interfacing with a plurality of subscriber devices. These interfaces may be, but are not limited to, 100 Mbit Ethernet, 1 Gigabit Ethernet, 10 Gigbit Ethernet, and the like. The Ethernet MAC adapter 450 is capable of receiving upstream data flow from subscribe devices and transmitting downstream data to subscribers. The PON MAC adapter 460 processes traffic in accordance with the various PON modes that include, but are not limited to, a Gigabit PON (GPON), a Broadband PON (BPON), an Ethernet PON (EPON), or any combination therefore. The PON MAC adapter 460 handles received downstream data flows and transmits upstream data flows. Either upstream or downstream data flows are respectively forwarded to or received from the packet processor 410 via the data-path bus 470.

As discussed above, the firmware of the packet processor 410 is programmable to include multiple processing stages that may include, but are not limited to, parsing, classifying, filtering, encrypting, and routing/bridging of packets. In accordance with an embodiment, one or more of the processing stages can be performed by the microprocessor-data 420. The user can define that certain flows will be processed, in part, by the microprocessor-data 420. That is, one or more of the functions will be performed by the microprocessor-data 420 instead of the packet processor 410. With this aim, the user should program the software of the microprocessor-data 420 with the functions to be performed. In addition, the user should designate in a flow table the flows (by the flow-ID) that should be processed by the microprocessor-data 420 and at which processing stage that packets belonging to the designated flow should be dispatched to microprocessor-data 420. The flow table is typically kept in the internal memory of the packet processor 410.

Figure 5:
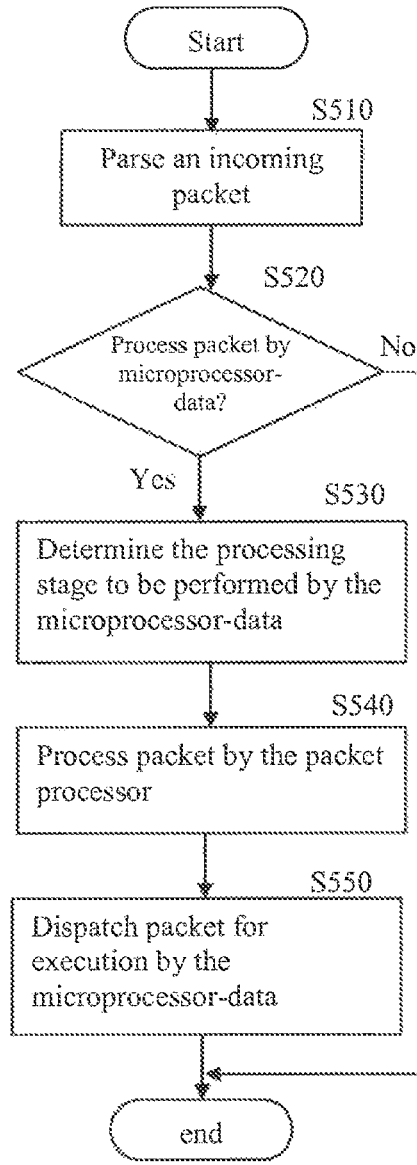
FIG. 5 is a flowchart illustrating a method for processing packets in the data-path.

The operation of the programmable data path comprising the packet processor 410 and the microprocessor-data 420 is further illustrated in FIG. 5. At S510, an incoming packet is parsed and classified to determine the flow-ID of the packet. At S520, it is checked if the flow-ID is designated in the flow table as required processing by the microprocessor-data 420, and if so, at S530, it is determined at which processing stage that packet should be dispatched to the microprocessor-data 420. At S540, the packet is processed by the packet processor 410, which at S550 transfers the packet to the microprocessor-data 420 at the processing stage determined at S530. As mentioned above, packets can be transferred directly through the data-path bus or retrieved from the external memory. In the latter embodiment, the packet processor 410 provides the microprocessor-data 420 with the packet information. At S550, once the processing of the microprocessor-data 420 is completed, processing results are returned to the packet processor 410 that may update the packet accordingly. Alternatively, the microprocessor-data 420 may transfer the packet to the packet processor 410 or write the processed packet in the external memory. If S520, results with a NO answer, execution terminates.

It should be noted that some packets belonging to a certain flow can be processed by the microprocessor-data 420 and some not. Therefore, it is important to maintain the order of packets output from the processor 200 as their input order. In accordance with an embodiment of the invention, packets per flow are reordered (to their input order) by the egress.

The architecture of a specific embodiment depicted in FIG. 4 is of a PON processor. However, a person with ordinary skill in the art can easily adapt the teachings disclosed herein to implement a network processor for access networks other than PONs.

The principles of the invention can be implemented as hardware, firmware, software or any combination thereof. Moreover, the software is preferably implemented as an application program tangibly embodied on a program storage unit, a non-transitory computer readable medium, or a non-transitory machine-readable storage medium that can be in a form of a digital circuit, an analogy circuit, a magnetic medium, or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

What is claimed is:

1. An apparatus comprising:
a packet processor configured to process packets belonging to a flow through a plurality of processing stages of a programmable data path; and
a microprocessor, in communication with the packet processor, configured to process a user-defined function in the programmable data path on designated packets belonging to the flow, wherein packets of the flow to be processed by the microprocessor are designated in a mapping and the designated packets processed by the microprocessor are returned to one of the plurality of processing stages of the packet processor for further processing.

2. The apparatus of claim 1, wherein the user-defined function includes tag manipulation, packet inspection, advanced access control, or quality of service.

3. The apparatus of claim 1, wherein the microprocessor is further configured to open connections, close connections, control a state of a connection, and identify traffic received on the connection.

4. The apparatus of claim 1, wherein the packet processor is configured to process the packets using firmware.

5. The apparatus of claim 1, wherein the microprocessor is configured to process the packets using software.

6. The apparatus of claim 5, wherein the software can be updated on-site.

7. The apparatus of claim 1, wherein the packet processor is further configured to dispatch the packets to the microprocessor.

8. The apparatus of claim 7, wherein dispatching the packets comprises providing the microprocessor with a packet information comprising a flow-ID, a MAC address, an IP address, and a port number.

9. The apparatus of claim 1, wherein the microprocessor comprises program memory, data memory, and context memory.

10. The apparatus of claim 1, wherein the packet processor comprises program memory, data memory, and context memory.

11. The apparatus of claim 1, wherein the plurality of processing stages comprise parsing, classifying, filtering, encrypting, routing, or bridging of the packets.

12. The apparatus of claim 1, wherein the user-defined function includes one or more of the plurality of processing stages.

13. The apparatus of claim 1, wherein the packet processor comprises the mapping configured to designate which flow-IDs are to be processed by the microprocessor.

14. A method for processing packets in a programmable data path of a network processor, comprising:
processing, by a packet processor, packets belonging to a certain flow through a plurality of processing stages of the programmable data path;
dispatching, upon completion of an $N^{th}$ processing stage in the programmable data path, the packets to a microprocessor, wherein the $N^{th}$ processing stage is designated as a processing stage at which the packets should be dispatched;
performing, by the microprocessor, a user-defined function on the designated packets; and
returning the designated packets to one of the plurality of processing stages of the packet processor to complete processing of the designated packets.

15. The method of claim 14, wherein the processing, by the packet processor, uses firmware.

16. The method of claim 14, wherein the performing the user-defined function, by the microprocessor, uses software.

17. The method of claim 16, further comprising updating the software on-site.

18. The method of claim 14, wherein the performing the user-defined function comprises performing a functionality of one of the plurality of processing stages.

19. The method of claim 14, wherein the plurality of processing stages include at least one of parsing, classifying, filtering, encrypting, routing, and bridging of the packets.

20. The method of claim 14, wherein the user-defined function includes at least one of user custom virtual local area network (VLAN) tag manipulation, packet inspection, advanced access control, and quality of service (QoS) related functions.

21. The apparatus of claim 1, wherein all packets belonging to the flow are designated to be processed by the microprocessor.

* * * * *